United States Patent
Angell et al.

(10) Patent No.: US 11,802,632 B2
(45) Date of Patent: Oct. 31, 2023

(54) MODULATING BUTTERFLY VALVE CONTROL

(71) Applicant: Bell Textron Inc., Fort Worth, TX (US)

(72) Inventors: David M. Angell, Fort Worth, TX (US); Keith D. Weaver, North Richland Hills, TX (US); Richard G. Otten, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 101 days.

(21) Appl. No.: 17/362,475

(22) Filed: Jun. 29, 2021

(65) Prior Publication Data

US 2022/0412481 A1 Dec. 29, 2022

(51) Int. Cl.
*F16K 1/22* (2006.01)
*F16K 37/00* (2006.01)
*G05B 15/02* (2006.01)

(52) U.S. Cl.
CPC .......... *F16K 37/0041* (2013.01); *F16K 1/221* (2013.01); *G05B 15/02* (2013.01)

(58) Field of Classification Search
USPC ........................................................ 700/282
See application file for complete search history.

(56) References Cited

U.S. PATENT DOCUMENTS

| | | | | |
|---|---|---|---|---|
| 2011/0252875 | A1* | 10/2011 | Grossmann | F02D 9/10 73/114.31 |
| 2012/0053812 | A1* | 3/2012 | Bauerle | F02D 41/0077 701/101 |
| 2015/0370261 | A1* | 12/2015 | Yokoyama | G05D 7/0635 700/282 |

FOREIGN PATENT DOCUMENTS

DE 102014208178 A1 * 11/2015 ............... F16K 1/00
JP 2002286149 A * 10/2002

* cited by examiner

*Primary Examiner* — Emilio J Saavedra
(74) *Attorney, Agent, or Firm* — Frost Brown Todd LLP

(57) ABSTRACT

A method and system for controlling a fluid valve are described that avoid the effects of hysteresis. In hysteresis, the power signals associated with a valve position are different on the upstroke and downstroke. As a result, predicting the valve position can be difficult if you only know the current power signal. Instead of using upstrokes and downstrokes, a valve can momentarily be set to zero power, or a rest position when receiving a new command signal. This way the command signal is applied from a zero power or rest position, making the valve position more predictable and accurate.

20 Claims, 6 Drawing Sheets

MODULATING BUTTERFLY VALVE CONTROL

TECHNICAL FIELD

The present disclosure is directed to fluid valves and more particularly to valve control systems.

BACKGROUND OF THE INVENTION

When using a butterfly valve for flow control, valve hysteresis limits precision, as valve position is not exclusively dependent on input. Valve position is additionally dependent on prior input and current position. As such, if the input signal is decreased, the hysteresis causes a dead zone where decreasing the input signal does not decrease the valve position until the decreasing curve is reached. As a result, for any specific input signal, there exists a range of potential valve positions dependent on the prior peak input signal. The dead zone also prevents fine adjustments of valve position.

BRIEF SUMMARY OF THE INVENTION

One embodiment under the present disclosure comprises a butterfly valve for manipulating fluid flow, comprising: a housing configured to receive a fluid; a disc configured to rotate on its axis within the housing; and a controller configured to regulate fluid flow through the butterfly valve by rotating the disc on its axis, wherein the controller is configured to apply a first input signal to move the disc from a rest position to a first position, and wherein when the controller receives a command to move the disc to a second position, if the second position is a larger rotational distance to the rest position than the first position, then the controller applies a second input signal associated with the second position, and if the second position is a smaller rotational distance to the rest position than the first position, then the controller first applies zero input and then applies a second input signal associated with the second position.

Another embodiment can comprise a valve for controlling fluid flow, comprising: a housing configured to receive a fluid; a gate operable to at least partially restrict a flow of the fluid through the housing; and a controller configured to adjust the gate, wherein the controller is configured to receive a first command to apply a first input signal to the gate, the first input signal associated with moving the gate from a rest position to a first position, the controller further configured to receive a second command to apply a second input signal to the gate, the second input signal associated with moving the gate from the rest position to a second position, wherein if the second position is between the rest position and the first position, then the controller is configured to adjust the gate to the rest position momentarily and then to apply the second input signal.

Another embodiment can comprise a method of controlling a fluid valve, comprising: sending a first command signal to a controller for the fluid valve, the controller configured to adjust a gate of the fluid valve to a first position from a rest position; and sending a second command signal to the controller, the second command signal associated with a second position between the first position and the rest position, wherein the controller is configured to, upon receiving the second command signal, adjust the gate to the rest position momentarily and then adjust the gate to the second position.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
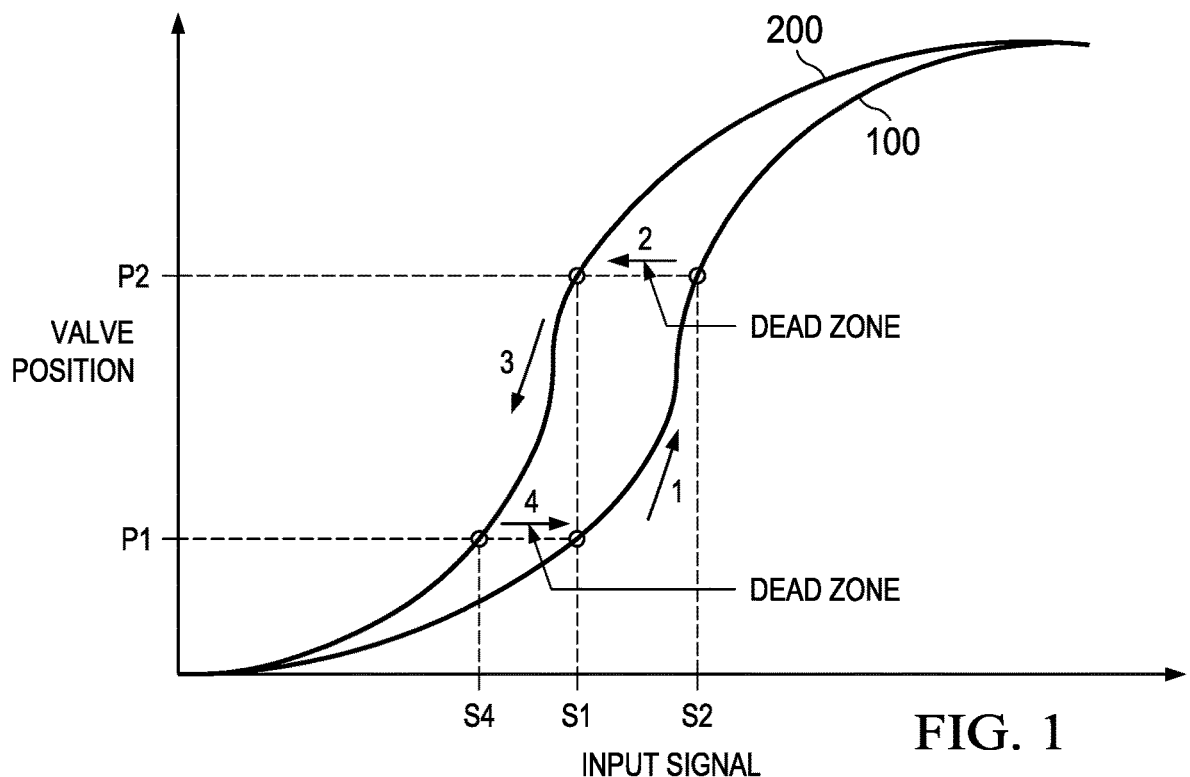
FIG. 1 is a diagram of hysteresis.

Referring now to FIG. 1, a traditional valve control curve illustrating the effects of hysteresis can be seen. At 1, increasing input (the upstroke 100) can move a valve to a given position, near 2. At 2, as decreasing input begins, at first the valve position does not change, then the valve will move to a different position and begin closing with decreasing input (the downstroke 200). The valve does not change position right away due to hysteresis, only proceeding to the downstroke once the changing signal was significant enough to overcome the hysteresis. During the downstroke 200 the valve position will follow 3. Arrow 2 shows a dead zone in which position and control of the valve is imprecise. A dead zone 4 also exists when the input signal is increased after the position was decreased, such as going from 3 back to 1, which would cause dead zone 4. As can be seen, for any given input value, two different valve positions are possible. To determine valve position, one must know whether the valve is undergoing the upstroke 100 or downstroke 200 and prior signal/position. This adds uncertainty into the control process for the valve.

Figure 2:
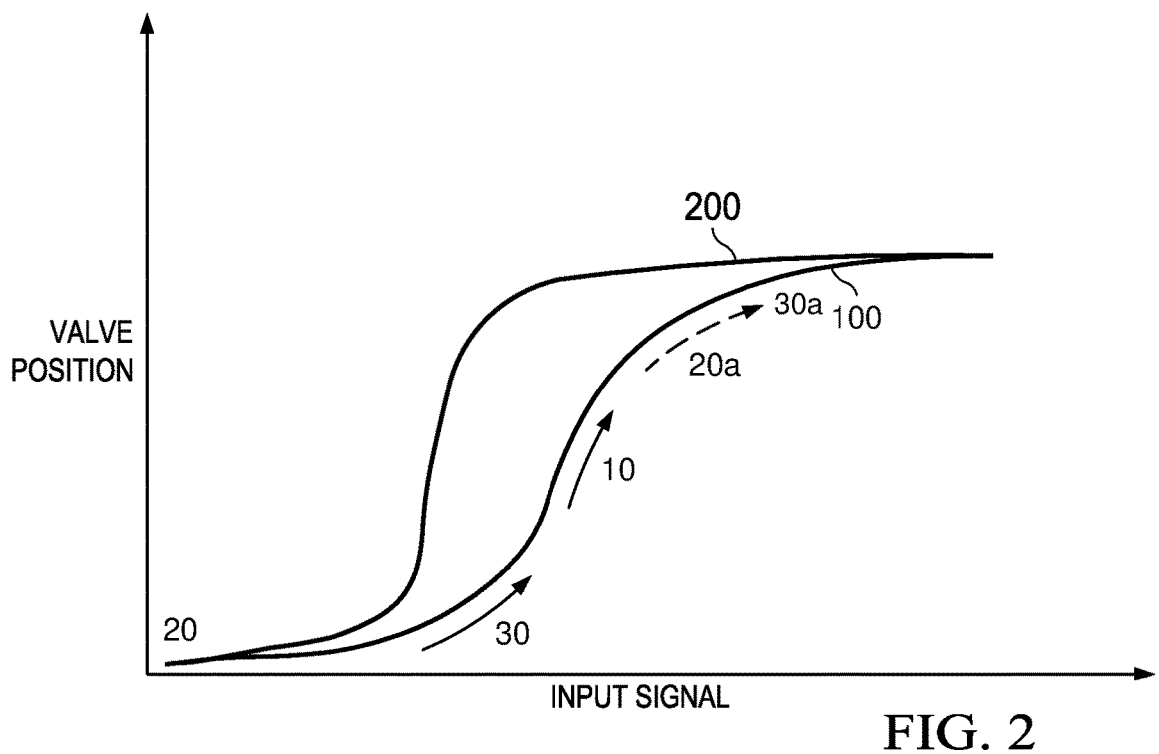
FIG. 2 is a diagram of one embodiment under the present disclosure.

Solutions for this problem include numerous embodiments under the present disclosure. One solution to the effect of hysteresis on a butterfly valve, where upstroke and downstroke have different valve locations for the same input signal, is to try and stay on the upstroke, or always be increasing input to achieve new position. Referring to FIG. 2, a manner of controlling input signals for a valve under the present disclosure can be seen. An initial input 10 can take the valve position to a given position on the upstroke 100. When a new valve position is desired, the new position may be higher or lower on the upstroke 100. If higher, then an additional input signal 20a is applied resulting in a new position 30a. However, sometimes the desired new position is lower on the upstroke 100. Previously, the decreasing signal would have no impact on valve position until the signal reached the downstroke curve (see FIG. 1, line 2) then, if the decrease was significant enough to overcome the hysteresis, the valve position would proceed down the downstroke curve until the position on the downstroke curve corresponding to the new input was reached. In these situations, fine movements are very difficult to measure or control, and it results in multiple possible positions for the same input signal. Under the present disclosure, such as in FIG. 2, the control system can close the valve at 20, then apply a new input signal 30, that is lower than previous input signal 10 resulting in a position 30 of the valve lower on the upstroke 100.

Figure 3:
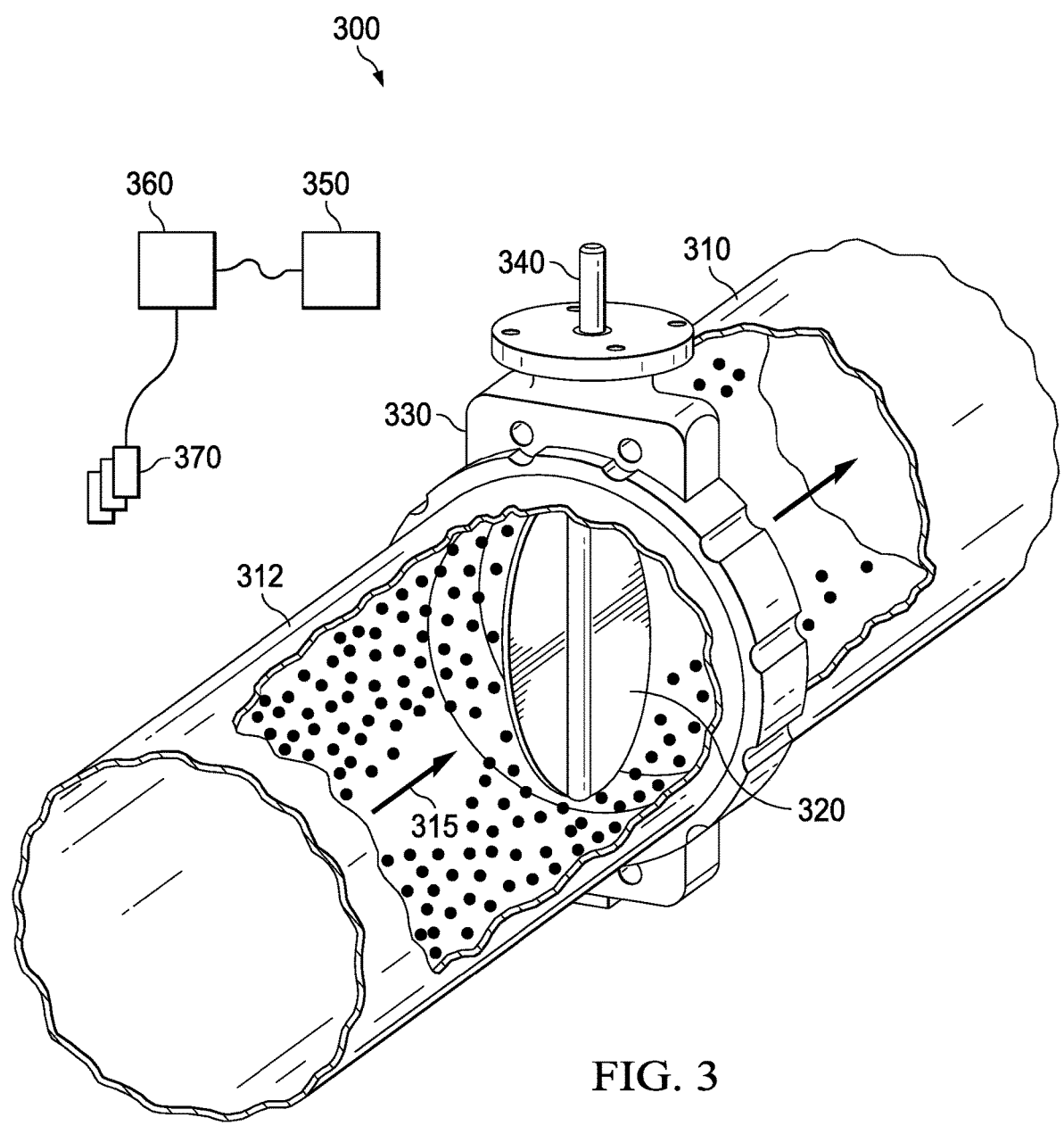
FIG. 3 is a diagram of a butterfly valve under the present disclosure.

FIG. 3 shows an embodiment of a butterfly valve 300. As shown, butterfly valve 300 is between pipes 310, 312 that are transporting a fluid 315. Butterfly valve 300 comprises a disc 320 that spins on its axis on rod 340. Housing 330 can be adapted to connect to pipes 310, 312 and to provide rigidity and protection for rod 340 and disc 320. Modulator 350 can couple to rod 340 such that it can spin the rod 340 and thereby control the opening and closing of disc 320 to block or restrict the fluid 315. Controller 360 can couple to modulator 350. In some embodiments modulator 350 and controller 360 can comprise one component. Controller 360 can be communicatively coupled to a control system 370, such as a vehicle control system, HVAC (heating, ventilation and air conditioning) control system, or another control system. Connections can be wired or wireless. A user of control system 370, or software running on the control system 370, can direct the opening and closing of disc 320, and thereby the butterfly valve 300.

Figure 4A:
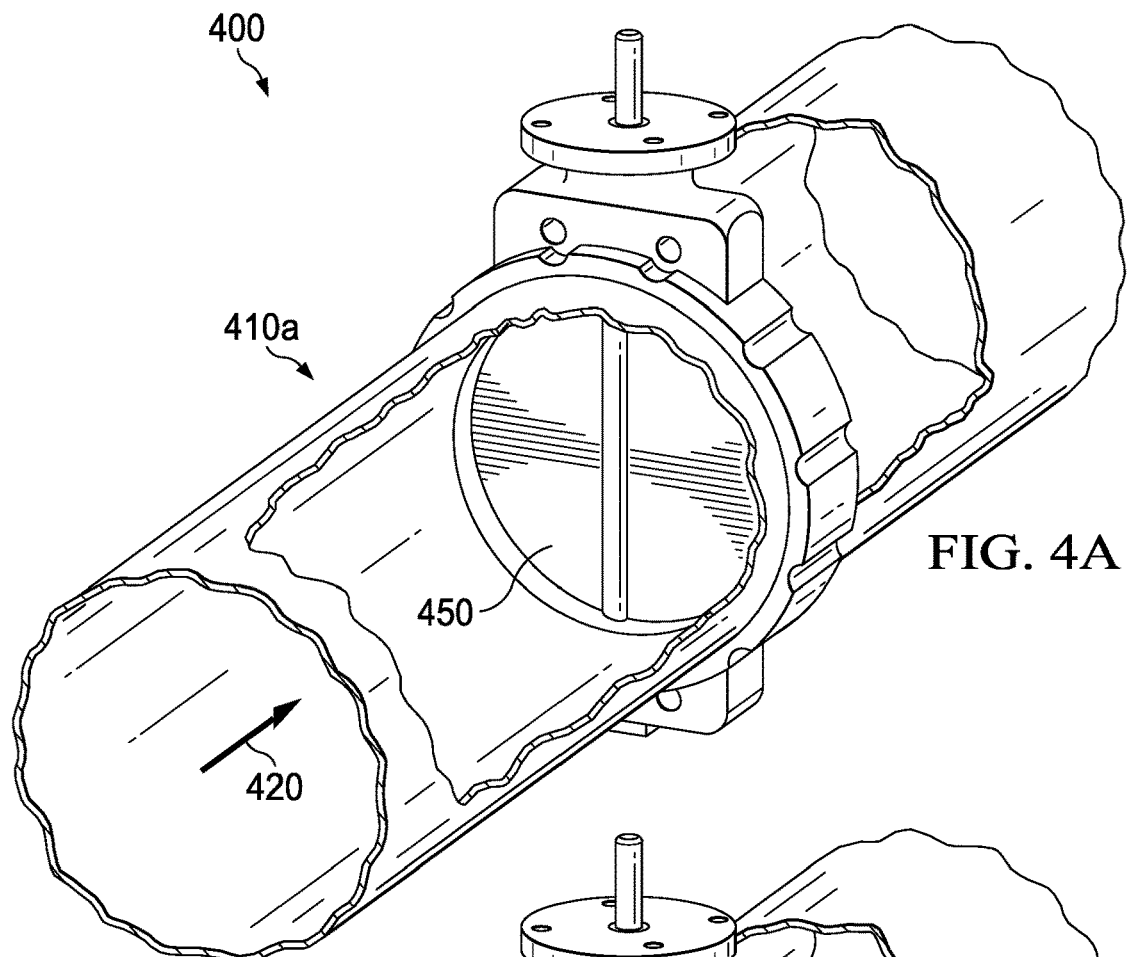
FIGS. 4A-4D are diagrams of a butterfly valve under the present disclosure.
Figure 4B:
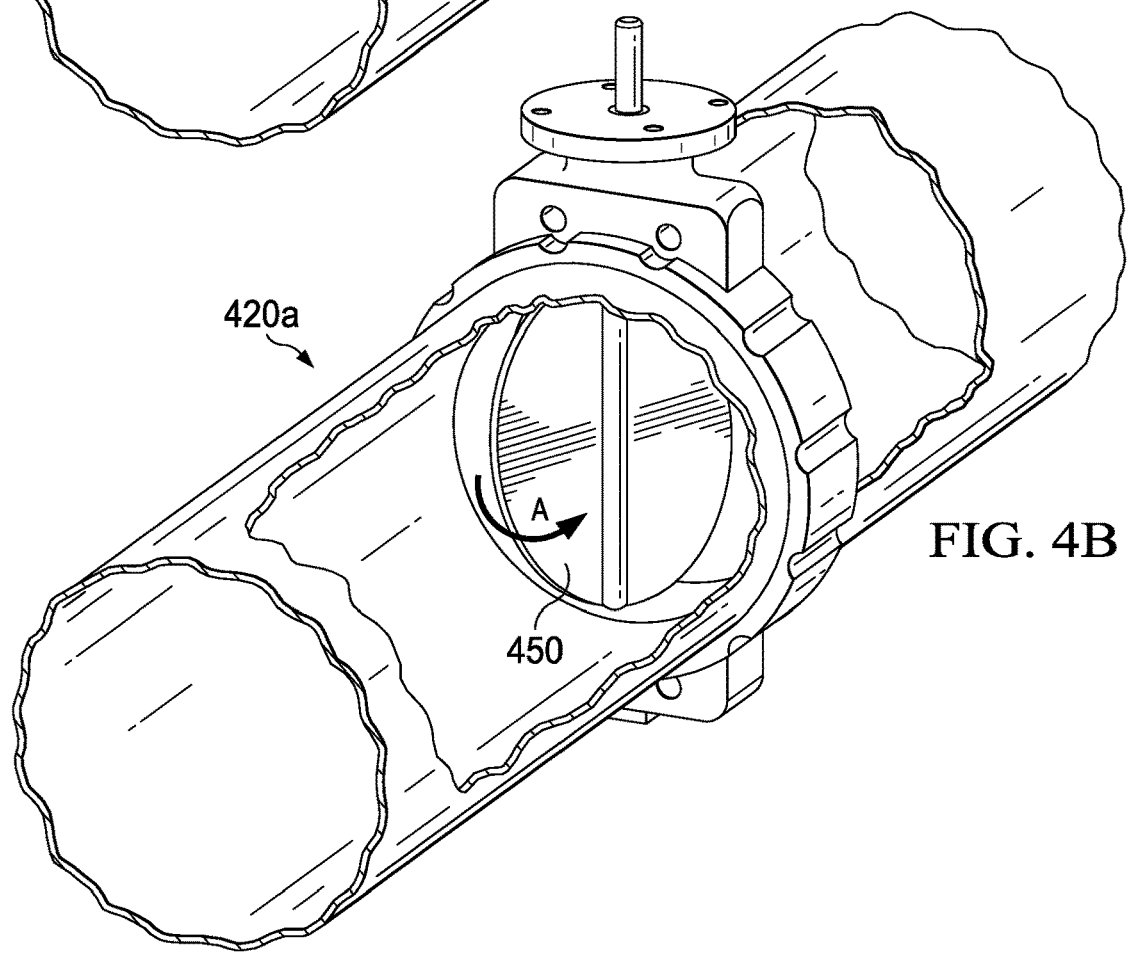
Figure 4C:
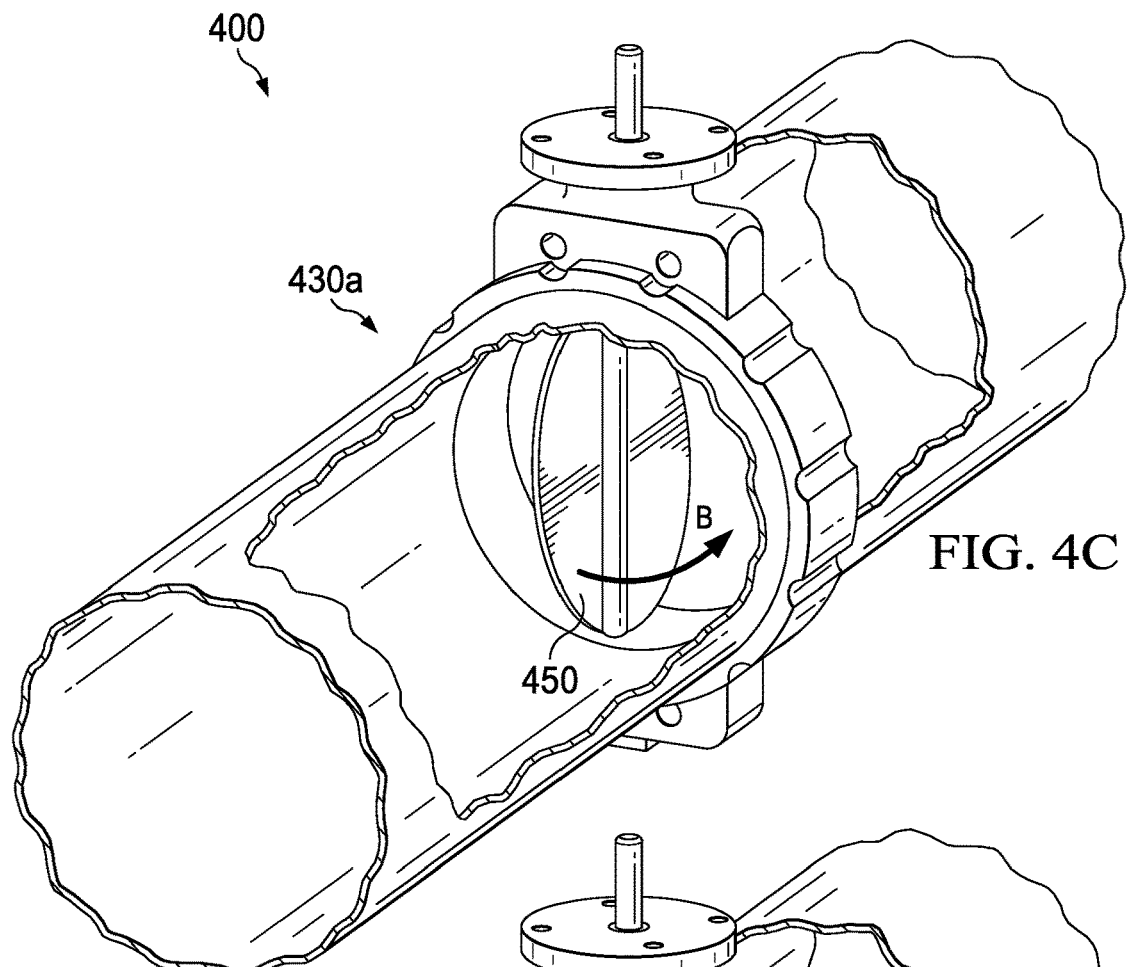
Figure 4D:
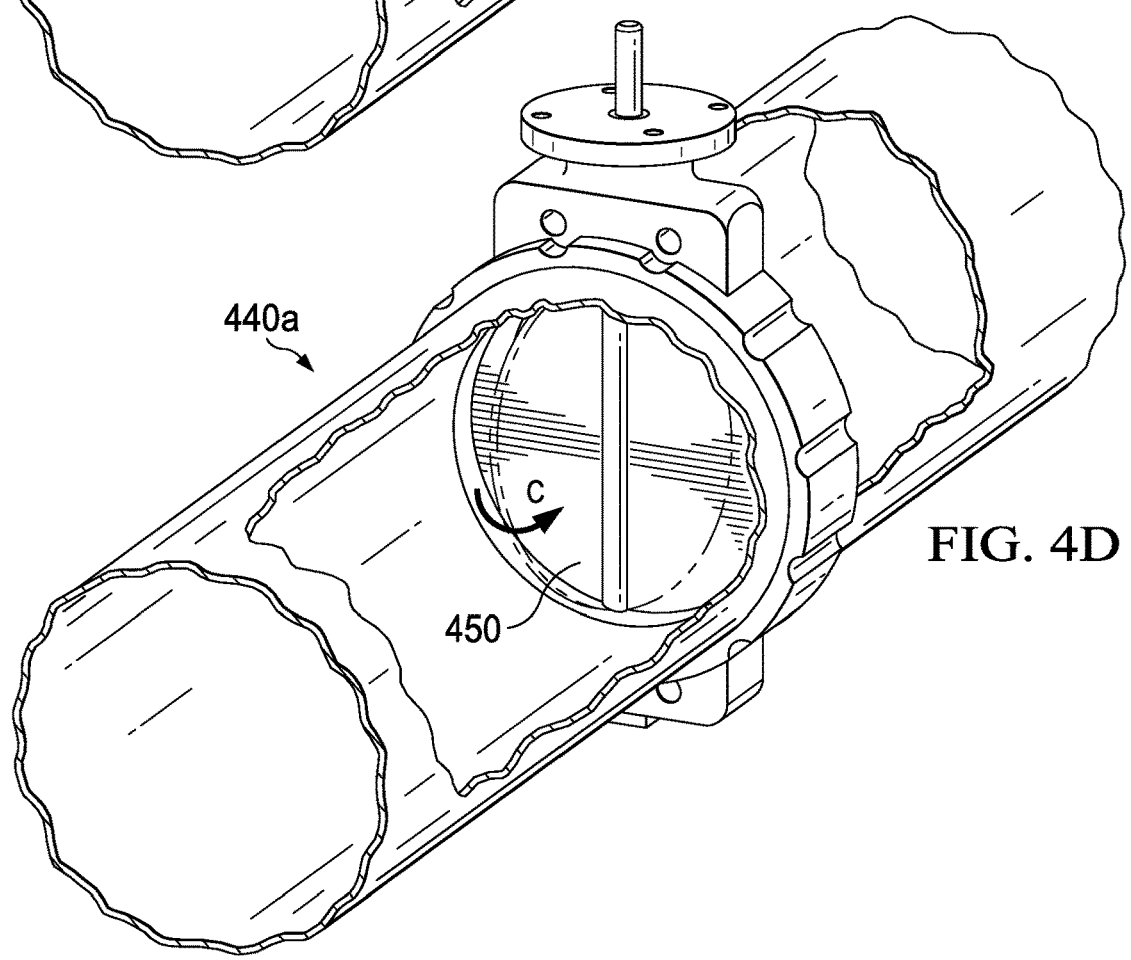

FIGS. 4A-4D show an embodiment of a butterfly valve 450 in a pipe 400 with reference to some of the teachings described herein. Fluid in pipe 400 can follow a direction of flow 420. At time 410a, the valve 450 is closed. In FIG. 4B, at time 420a an input signal SA (not shown) has moved the valve 450 to position A. In FIG. 4C, at time 430a, an input signal SB (not shown) has moved the valve 450 from position A to position B (where B is greater than A, as in a greater angle from horizontal or closed in this view). In FIG. 4D, at time 440a, it is desired for the valve 450 to go to position C. Previously, for cases in which C is between A and B, a downstroke would add imprecision to control of the valve 450 via a dead zone (caused by hysteresis). Previously, signal would be reduced to reach point C. however, due to hysteresis, this method can be imprecise. For example, moving to position B might require 10 volts when moving from 0, and moving to position C from 0 could require 5 volts. Due to hysteresis, when at point B, powering down from 10 volts to 5 volts will not necessarily result in the valve moving to position C. As shown in FIGS. 1 and 2, the input signal for a given position is different on the upstroke and the downstroke.

The current disclosure can utilize a different system or method in getting from B to C. Under the present disclosure, the input signal can be set to 0 momentarily and then an input sign $S_C$ (not shown) can be applied to move the valve to position C. In this embodiment valve 450 is constructed to be horizontal/closed at zero power. In the view shown in FIG. 4, C can be any value below B. If C were larger than B (greater angle from horizontal) then the system would not have to momentarily go to 0, but would just apply more power to move from B to a higher position.

The embodiment shown in FIGS. 4A-4D comprises a valve 450 that is set to have zero power be a closed position. However, other embodiments are possible wherein the closed position requires power. If, for instance, the zero position requires 10 volts, then 10 volts can be taken as a reference point, and power inputs to achieve various positions, such as A, B, and C in FIG. 4, can all be measured with reference to 10 volts at the closed position. Going to the zero position can comprise going down to 10 volts from whatever current voltage is at the respective position. Other valves may incorporate different setups such as a valve being open at zero power, or at another position.

Figure 5:
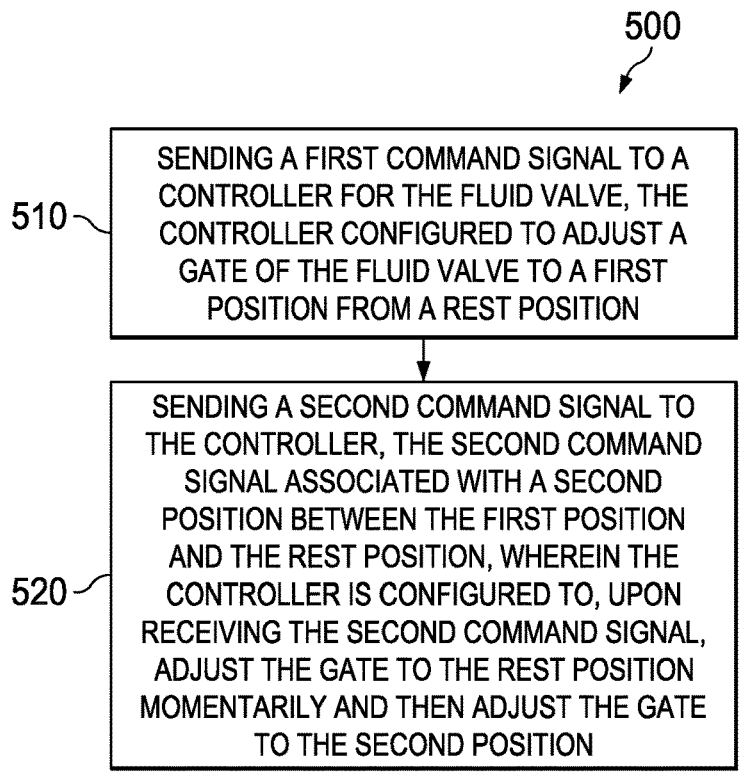
FIG. 5 is a flow chart of a method embodiment under the present disclosure.

FIG. 5 shows a possible method 500 for controlling a valve under the present disclosure. Step 510 is sending a first command signal to a controller comprising the valve, the controller configured to adjust a gate of the fluid valve to a first position from a rest position. Step 520 is sending a second command signal to the controller, the second command signal associated with a second position between the first position and the rest position, wherein the controller is configured to, upon receiving the second command signal, adjust the gate to the rest position momentarily and then adjust the gate to the second position.

Figure 6:
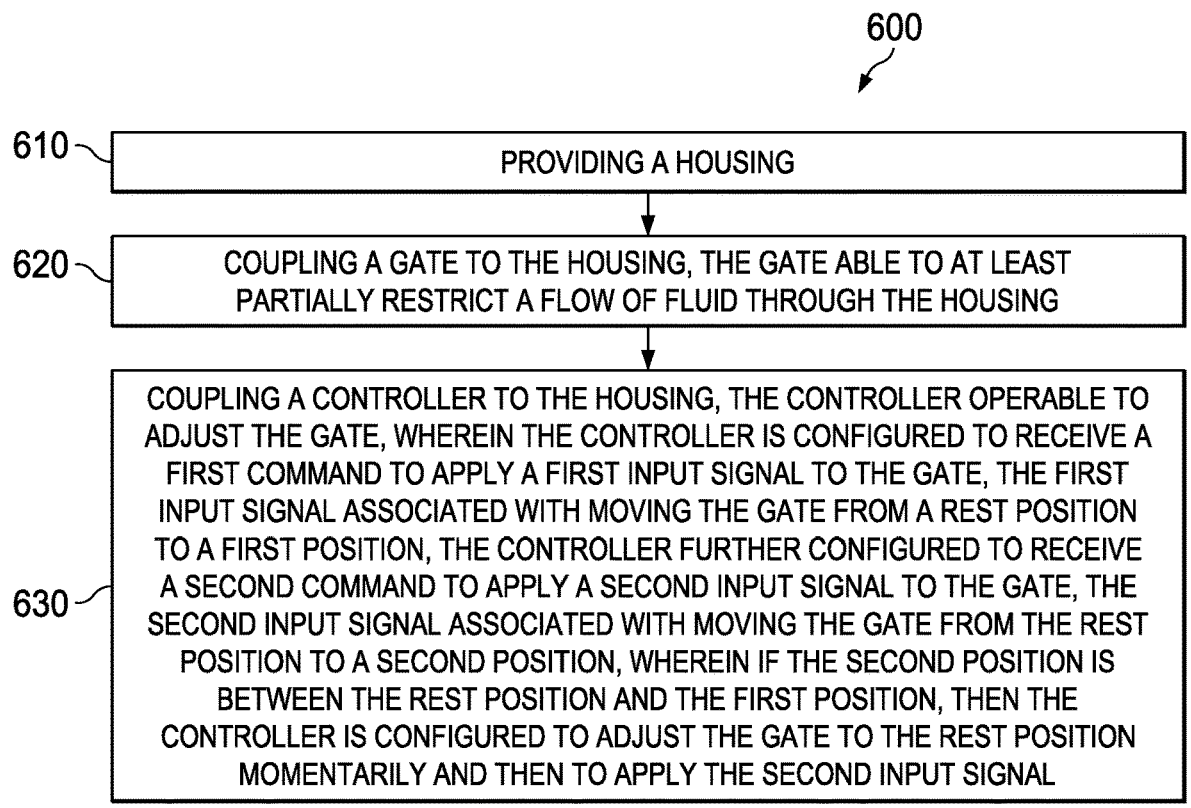
FIG. 6 is a flow chart of a method embodiment under the present disclosure.

FIG. 6 shows possible method 600 of constructing a valve under the present disclosure. Step 610 is providing a housing. Step 620 is coupling a gate to the housing, the gate able to at least partially restrict a flow of fluid through the housing. Step 630 is coupling a controller to the housing, the controller operable to adjust the gate, wherein the controller is configured to receive a first command to apply a first input signal to the gate, the first input signal associated with moving the gate from a rest position to a first position, the controller further configured to receive a second command to apply a second input signal to the gate, the second input signal associated with moving the gate from the rest position to a second position, wherein if the second position is between the rest position and the first position, then the controller is configured to adjust the gate to the rest position momentarily and then to apply the second input signal.

Figure 7:
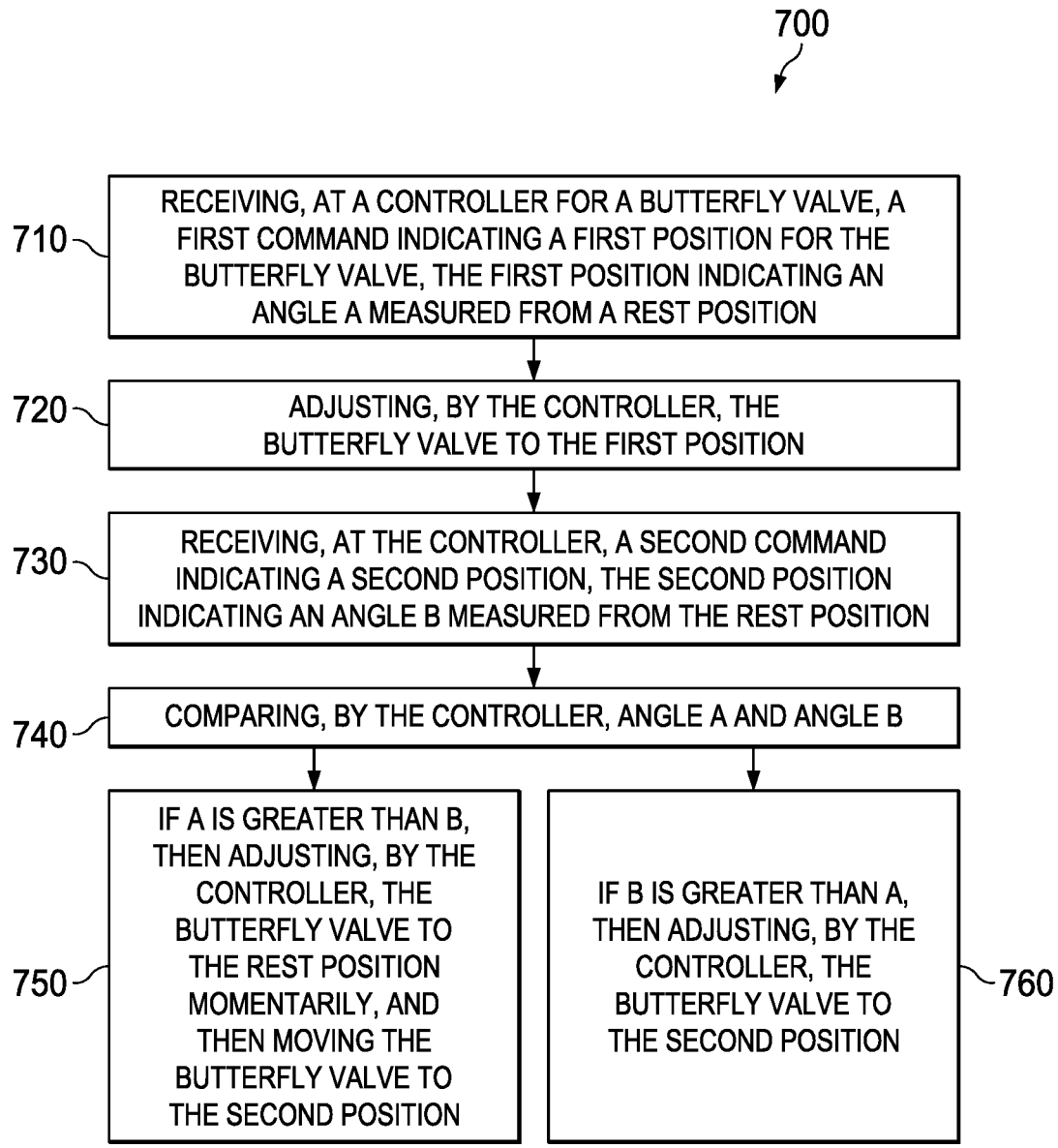
FIG. 7 is a flow chart of a method embodiment under the present disclosure.

FIG. 7 shows another possible method embodiment 700 for controlling a butterfly valve under the present disclosure. Step 710 is receiving, at a controller for a butterfly valve, a first command indicating a first position for the butterfly valve, the first position indicating an angle A measured from a rest position. Step 720 is adjusting, by the controller, the butterfly valve to the first position. Step 730 is receiving, at the controller, a second command indicating a second position, the second position indicating an angle B measured from the rest position. Step 740 is comparing, by the controller, angle A and angle B. At 750, if A is greater than B, then adjusting, by the controller, the butterfly valve to the rest position momentarily, and then moving the butterfly valve to the second position. At 760, if B is greater than A, then adjusting, by the controller, the butterfly valve to the second position. Alternatively, the controller can compare the power levels associated with the commands, instead of an angle. At step 730, a second command is received and then at 740 the power levels of the first and second commands are compared. If the second power level is less than the first power level from the first command, then the controller resets the valve to the rest position momentarily before moving to the second position.

Although description has focused on butterfly valves, other valves that undergo hysteresis may utilize the teachings of the present disclosure as well. Butterfly, gate, ball, and other types of valves that undergo hysteresis can take advantage of the teachings presented herein. This disclosure could be applied to any valve subject to effects of hysteresis. For example, control logic can be modified as taught herein to mitigate/eliminate the effect of hysteresis and ensure that there is only one achievable result (e.g. valve position) corresponding to a given input signal. One means of achieving this is by ensuring that the valve is always operating on the upstroke curve (alternatively, one could ensure always on the downstroke curve). In order to operate exclusively on a single curve, all changes in input signal that move the valve to a new position can be in a common known direction (be that increasing or decreasing). When the input delta is not in that specified direction—then the valve can be returned to a known or reset condition (signal/position combination). This can be a condition where the upstroke and downstroke curves are coincident such as full close or full open—as appropriate such that the signal change from that known rest position to the new position will be in the intended direction and accordingly valve operated on the specified curve. Valves under the current disclosure can comprise plastic, metal, composites, or any other appropriate material or mixture of materials. Some components of a valve may be one material, while other components may comprise other types of materials.

Some embodiments under the present disclosure include momentarily applying zero power. "Momentarily" will typically be a time period less than a second. But any short time interval can be used if it accomplishes the desires of the user and provided the interval does not unacceptably impact the performance of the system in which the valve is utilized.

The embodiments described above utilize a momentary application of zero power to reset a gate/ball in a valve to a closed position. Additional embodiments under the current disclosure can use a reversed design with a reset or rest position at full power—instead of returning to the zero input it would return to 100% input. This could be used in valves that are normally open and powered to close. In these embodiments, the "reset" position can still be a closed position, but it is done by sending 100% input. A further embodiment can comprise having a reset position at an open valve with 100% power. This can be useful in situations where it is preferred to have the valve fully opened. For these embodiments 100% input can be provided to open the valve at each reset instead of closing it.

In embodiments where 100% input is used at the reset position, then power can be subtracted or lowered in a predictable way. The behavior of the valve would essentially be descending the graph of FIG. 1, along curve 3. As the valve descends curve 3, and descends in power, the position of the valve will remain predictable. When the valve must ascend curve 3 to a higher value, then applying full power will return the gate position to the top of curve 3, and then power can be subtracted in a predictable way to move to the new desired position.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A butterfly valve for manipulating fluid flow, comprising:
a housing configured to receive a fluid;
a disc configured to rotate on its axis within the housing; and
a controller configured to regulate fluid flow through the butterfly valve by rotating the disc on its axis, wherein the controller is configured to apply a first input signal to move the disc from a rest position to a first position located a first rotational distance from the rest position, and wherein when the controller receives a command to move the disc to a second position located a second rotational distance from the rest position, if the second rotational distance is larger than the first rotational distance, then the controller applies a second input signal associated with the second position, and if the second rotational distance is smaller than the first rotational distance, then the controller momentarily applies an input associated with the rest position and then applies the second input signal associated with the second position.

2. The butterfly valve of claim 1 wherein the rest position comprises a closed position.

3. The butterfly valve of claim 1 wherein the rest position comprises an open position.

4. The butterfly valve of claim 1 wherein the controller comprises a computer remote to the disc.

5. The butterfly valve of claim 1 wherein the controller is communicatively coupled to a remote computer.

6. The butterfly valve of claim 1 wherein the controller is communicatively coupled to a vehicle control system.

7. The butterfly valve of claim 1 wherein the butterfly valve is operable to regulate a flow of air in a helicopter.

8. The butterfly valve of claim 1 wherein the controller is communicatively coupled to a control system for an aircraft.

9. A valve for controlling fluid flow, comprising:
a housing configured to receive a fluid;
a barrier operable to at least partially restrict a flow of the fluid through the housing; and
a controller configured to adjust the barrier, wherein the controller is configured to receive a first command to apply a first input signal to the barrier, the first input signal associated with moving the barrier from a rest position to a first position, the controller further configured to receive a second command to apply a second input signal to the barrier, the second input signal associated with moving the barrier from the rest position to a second position, wherein if the second position is between the rest position and the first position, then the controller is configured to adjust the barrier to the rest position momentarily and then to apply the second input signal.

10. The valve of claim 9 wherein the valve comprises a gate valve and the barrier comprises a gate.

11. The valve of claim 9 wherein the housing comprises a plastic.

12. The valve of claim 9 wherein the valve comprises an air flow system in an aircraft.

13. The valve of claim 9 wherein the controller is communicatively coupled to a control system of an aircraft.

14. The valve of claim 9 wherein the controller is communicatively coupled to an HVAC control system.

15. The valve of claim 9 wherein the controller is coupled to the gate by an actuator.

16. The valve of claim 9 wherein the rest position is associated with an input signal of 0.

17. A method of controlling a fluid valve, comprising:

sending a first command signal to a controller for the fluid valve, the controller configured to adjust a barrier of the fluid valve to a first position from a rest position; and sending a second command signal to the controller, the second command signal associated with a second position between the first position and the rest position, wherein the controller is configured to, upon receiving the second command signal, adjust the barrier to the rest position momentarily and then adjust the barrier to the second position.

18. The method of claim 17, wherein the rest position is an open position.

19. The method of claim 17, wherein the rest position is a closed position.

20. The method of claim 17, wherein the fluid valve comprises a ball valve.

* * * * *